United States Patent [19]

Etchu et al.

[11] Patent Number: 5,620,774
[45] Date of Patent: *Apr. 15, 1997

[54] BIAXIALLY ORIENTED LAMINATED POLYESTER FILM

[75] Inventors: Masami Etchu, Yokohama; Hirofumi Murooka, Sagamihara, both of Japan

[73] Assignee: Teijin Limited, Osaka, Japan

[*] Notice: The term of this patent shall not extend beyond the expiration date of Pat. No. 5,516,574.

[21] Appl. No.: 387,242

[22] Filed: Feb. 13, 1995

Related U.S. Application Data

[62] Division of Ser. No. 65,896, May 25, 1993, abandoned.

[30] Foreign Application Priority Data

May 27, 1992 [JP] Japan ................... 4-135081
Jun. 15, 1992 [JP] Japan ................... 4-155013

[51] Int. Cl.⁶ ............................ G11B 5/704; B32B 5/16; B32B 27/36
[52] U.S. Cl. .................. 428/148; 428/141; 428/143; 428/147; 428/323; 428/327; 428/328; 428/480; 428/694 SL; 428/694 SG; 428/910; 428/213; 428/338
[58] Field of Search .................. 428/144, 143, 428/147, 323, 327, 328, 480, 148, 694 SL, 694 SG, 910, 213, 338

[56] References Cited

U.S. PATENT DOCUMENTS

| | | | |
|---|---|---|---|
| 5,051,292 | 9/1991 | Katoh et al. | 428/141 |
| 5,252,388 | 10/1993 | Murooka et al. | 428/328 |
| 5,368,932 | 11/1994 | Murooka et al. | 428/327 |
| 5,516,574 | 5/1996 | Ogawa et al. | 428/143 |

FOREIGN PATENT DOCUMENTS

| | | |
|---|---|---|
| 0347646 | 12/1989 | European Pat. Off. . |
| 0345644 | 12/1989 | European Pat. Off. . |
| 0378154 | 7/1990 | European Pat. Off. . |
| 0453276 | 10/1991 | European Pat. Off. . |
| 0490665 | 6/1992 | European Pat. Off. . |
| 0502745 | 9/1992 | European Pat. Off. . |
| 0524840 | 1/1993 | European Pat. Off. . |
| 0530774 | 3/1993 | European Pat. Off. . |
| 54-57562 | 5/1979 | Japan . |
| 3-001941 | 1/1991 | Japan . |
| 3-246033 | 11/1991 | Japan . |

*Primary Examiner*—William Watkins
*Attorney, Agent, or Firm*—Sherman and Shalloway

[57] ABSTRACT

A biaxially oriented laminated polyester film comprising:
(A) a first thin polyester layer formed from an aromatic polyester containing two kinds of inert fine particles having different size and
(B) a second polyester layer formed from an aromatic polyester, on at least one surface of which the above first thin polyester layer is present. This biaxially oriented laminated polyester film is is excellent in lubricity, abrasion resistance and scratch resistance and is particularly useful as a base film for a magnetic recording medium.

2 Claims, 1 Drawing Sheet

BIAXIALLY ORIENTED LAMINATED POLYESTER FILM

This is a division of application Ser. No. 08/065,896 filed May 25, 1993.

DETAILED DESCRIPTION OF THE INVENTION

The present invention relates to a biaxially oriented laminated polyester film. More specifically, it relates to a biaxially oriented laminated polyester film which is excellent in lubricity, abrasion resistance and scratch resistance and is particularly useful as a base film for a magnetic recording medium.

Having excellent properties, a biaxially oriented polyester film is used in a variety of fields such as magnetic tapes, electrical appliances, photographs, metallization and packaging. Above all, due to its high strength and a high elastic modulus, it is widely used as a base film for a magnetic recording medium, e.g., a video tape, an audio tape, a computer tape and a floppy disk.

With increasing demands for high-density recording and high quality in the above fields in recent years, a polyester film which is to constitute a base film is increasingly required to have flat surface(s).

As the flatness of a film surface increases, for example in the field of magnetic tapes, the film has an increased coefficient of friction, and the tape is liable to suffer a failure in running and to undergo scratching. Further, as the flatness of a film surface increases, the form of a film roll extraordinarily deteriorates at a step of taking up the film in the form of a roll in film production, and it is difficult to prepare a film roll in a good form. Further, for higher productivity, it is required to increase the take-up rate and the film width, while it is increasingly difficult to prepare a film roll in a good form because of increases in the take-up rate and width.

A polyester film which is to constitute the above base is therefore required to be excellent not only in surface flatness but also in lubricity for preparing a film roll in a good form.

For improving the lubricity of a film, there have been proposed a method in which inorganic fine particles of silicon oxide or calcium carbonate are added to a polyester and a method in which fine particles containing calcium, lithium or phosphor are deposited in a polymerization system when a polyester is synthesized. These two methods sought to improve the lubricity of a film by forming fine protrusions derived from fine particles on the film surface when the film is formed from a polyester.

However, in the above methods of improving the film lubricity by means of protrusions formed of fine particles, generally, the lubricity improves as the roughness of the film surface increases, whereas, for example, in the field of a magnetic recording medium, the surface of a magnetic layer formed by applying a magnetic coating composition is liable to be toughened due to the roughening of the film surface to deteriorate the electromagnetic characteristics.

For overcoming these contradicting problems of flatness and lubricity at the same time, there is proposed a method using a biaxially oriented laminated film whose front surface and back surface have different surface roughness, one surface being flat and the other surface being roughened for lubricity.

Japanese Laid-open Patent Publication No. 77,431/1990 discloses a biaxially oriented laminated film formed by laminating a film A on at least one surface of a film B, the film A being composed mainly of a thermoplastic resin A, e.g., an aromatic polyester and inert fine particles, the inert fine particles having an average particle diameter of 0.1 to 10 times as large as the film thickness and being contained in an amount of 0.1 to 50% by weight, the film thickness ranging from 0.005 to 3 µm; and the film B being composed mainly of a thermoplastic resin B and inert fine particles, the inert fine particles having an average particle diameter of 0.007 to 2 µm and being contained in an amount of 0.01 to 0.2% by weight.

Japanese Laid-open Patent Publication No. 1,941/1991 discloses a laminated film whose at least one outermost layer is composed of a polyester containing 0.01 to 5% by weight of inorganic particles having an average particle diameter of 5 µm or less and having a Mohs hardness of at least 8. It is described that the above inorganic particles are, for example, particles of aluminum oxide, silicon carbide or the like, and that the above polyester may contain other inorganic particles such as kaolin, talc or heat-resistant polymer fine powder in addition to the above inorganic fine particles having the above hardness.

Japanese Laid-open Patent Publication No. 246,088/0991 discloses a laminated polyester film for a magnetic recording medium, which is a laminate of a polyester layer A having a surface roughness (Ra) of 0.010 µm or less and a polyester layer B containing 0.01 to 4% by weight of crosslinked polymer particles having an average particle diameter of 0.05 to 3µm and a particle diameter ratio of 1.2 to 5.0.

Japanese Laid-open Patent Publication No. 294,124/1992 discloses a biaxially oriented laminated polyester film having a layer containing 0.05 to 2% by weight of internally deposited particles formed from inorganic particles A having a Mohs hardness of at least 6 and having an average primary particle diameter of at least 0.005 µm and less than 0.3 µm as cores and 0.05 to 2.0% by weight of inert particles B having an average primary particle diameter of at least 0.1µm and less than 3.0 µm, the ratio (d/t) of the average primary particle diameter (d·µm) of the above inert particles B to the thickness (t·µm) of the above layer being 0.05 to 3.

Japanese Laid-open Patent Publication No. 62,158/1998 discloses a polyester film for a magnetic recording medium, which is a laminate of a polyester layer A containing inorganic particles (a) having a Mohs hardness of at least 8 and an average particle diameter of 0.005 to 0.5 µm and inert particles (b) having a Mohs hardness of less than 8 and an average particle diameter which is greater than that of the inorganic particles (a) and is 0.1 to 3.0 µm, and a polyester layer B containing inert particles (c) having a Mohs hardness of less than 8 and an average particle diameter which is greater than that of the inorganic particles (a) and is 0.1 to 3.0 µm, the inorganic particles (a) being contained in an amount of 0.25 to 5% by weight based on the polyester amount of the polyester layer A and in an amount of 0.15%g by weight or less based on the total polyester amount of the polyester layers A and B, each of the inert particles (b) and the inert particles (c) being contained in an amount of 0.05 to 2.0% by weight based on the polyester amount of the corresponding polyester layer A or B, the exposed surfaces of the polyester layers A and B having friction coefficients (µd) and surface roughness (Ra) which satisfy the following expressions (1), (2) and (3), $$|\mu d^A - \mu d^B| \leq 0.005 \tag{1}$$

$$Ra^B \leq 0.030 \tag{2}$$

$$|Ra^A - Ra^B| \leq 0.005 \tag{3}$$

wherein $\mu d^A$ and $\mu d^B$ are respectively friction coefficients of exposed surfaces of the layers A and B, and $Ra^A$ and $Ra^B$ are respectively surface roughness of the layers A and B.

In the method using the above laminated film, the thin layer constituting a toughened surface is required to contain a large amount of inert particles to improve the lubricity. As a result, the abrasion resistance in the step of processing the film into a tape deteriorates, and at the time when a magnetic recording tape formed from the film is running, it is liable to undergo scratching and to produce abrasion dust to cause drop-out in many cases.

With speed-up of the tape production process in recent years, the calender and coater conditions tend to be further severe, and it is increasingly important to improve the film in abrasion resistance during the processing step.

On the other hand, for decreasing cost, a metal guide which is not sufficiently surface-finished or a plastic guide is used as a guide post fixed in the cassette, particularly in a cassette for a VTR. However, the surface of this guide post is very rough. Therefore, the following problem occurs in a magnetic tape which is obtained by applying a conventional method for the improvement of film lubricity and abrasion resistance, such as a method of adding inorganic particles of silicon oxide, titanium dioxide, calcium carbonate, talc, clay or calcined kaolin (see Japanese Laid-open Patent Publication No. 57,562/1979) or a method of depositing fine particles containing calcium, lithium or phosphor in a polymerization system but which is not provided with any back coating. That is, abrasion dust and scratching occur thereon in the step of taking it up into a cassette at a high velocity, and as a result, the drop-out level increases.

For overcoming the above problems, there is proposed a method in which fine particles having a high Mohs hardness are added to decrease scratching (see Japanese Laid-open Patent Publications Nos. 306,220/1989 and 185,533/1990).

The above methods show an effect on a guide post that is provided for the purpose of decreasing cost. However, they show little effect on a conventional metal guide which is sufficiently surface-finished. On the other hand, for preventing scratching in using a metal guide which is sufficiently surface-finished, there is also a method in which inert particles having a little greater size than the above fine particles are used in combination. However, there has been found a problem that abrasion dust occurs.

Further, due to the use of particles having high hardness, the edge of a slitting blade is extremely worn out in producing a polyester film or processing the polyester film into a magnetic tape, so that the life of the edge is decreased or the blade sharpness is dulled. This results in an increase of the amount of chips and a deterioration of the cut surface, which are liable to cause drop-out.

Therefore, it is an object of the present invention to provide a biaxially oriented laminated polyester film.

It is another object of the present invention to provide a biaxially oriented laminated polyester film which is excellent in abrasion resistance and scratch resistance and which is also superior in flatness and lubricity.

It is further another object of the present invention to provide a biaxially oriented laminated polyester film which utilizes the above-described properties to meet with the achievement of high-density and high-quality recording of the magnetic recording medium.

It is still further another object of the present invention to provide a biaxially oriented laminated polyester film for a magnetic recording medium, which exhibits excellent abrasion resistance and scratch resistance to all the guides including a metal guide which is sufficiently surface-finished, a metal guide having a rough surface and a plastic guide, exhibits excellent lubricity, and is free from wearing out a slitting blade used in production and processing steps.

Other objects and advantages of the present invention will be apparent from the following description.

According to the present invention, the above objects and advantages of the present invention are achieved, first, by a biaxially oriented laminated polyester film comprising:

(A) a first thin polyester layer formed from an aromatic polyester containing;
  (a) externally added inert inorganic fine particles having an average particle diameter, $d_a$, of 0.02 to 0.3 μm, and
  (b) externally added inert organic fine particles whose average particle diameter, $d_b$, is greater than $d_a$ and is 0.2 to 1.5 μm,
the above inorganic fine particles (a) being contained in an amount of 0.05 to 1.5% by weight, the organic fine particles (b) being contained in an amount of 0.001 to 1% by weight, the first thin polyester layer having a thickness (t) which satisfies the following expressions (1), (2) and (3) relative to the above $d_b$, $$d_b \leq 10t-1 \quad (1)$$

$$d_b \leq 0.5t-1 \quad (2)$$

$$0.12 \leq t \leq 4.0 \quad (3)$$

wherein t is a thickness of the layer, and the unit for t and $d_b$ is μm, and (B) a second polyester layer formed from an aromatic polyester, on at least one surface of which the above first thin polyester layer is present.

In the biaxially oriented laminated polyester film of the present invention, the aromatic polyester for the first polyester layer (A) is preferably selected from aromatic polyesters composed mainly of alkylene terephthalate and/or alkylene naphthalate.

Of the above polyesters, particularly preferred is polyethylene terephthalate, polyethylene-2,6-naphthalenedicarboxylate, and a copolymer formed from a dicarboxylic acid component at least 80 mol% of which is terephthalic acid and/or 2,6-naphthalenedicarboxylic acid, and a glycol component at least 80 mol% of which is ethylene glycol. The dicarboxylic acid component may contain less than 20 mol% of other dicarboxylic acid. The other dicarboxylic acid is selected from aromatic dicarboxylic acids other than the terephthalic acid and/or 2,6-naphthalenedicarboxylic, aliphatic dicarboxylic acids and alicyclic dicarboxylic acids. Examples of the above aromatic dicarboxylic acids include isophthalic acid, biphenyldicarboxylic acid, diphenyletherdicarboxylic acid, diphenylethane-dicarboxylic acid, diphenylsulfonedicarboxylic acid, and diphenylketonedicarboxylic acid. Examples of the aliphatic dicarboxylic acids include adipic acid and sebacic acid. Examples of the alicyclic dicarboxylic acids include cyclohexane-1,4-dicarboxylic acid. The glycol component may contain less than 20 mol% of other glycol component other than ethylene glycol. The other glycol component is selected from aliphatic diols such as trimethylene glycol, tetramethylene glycol, pentamethylene glycol, hexamethylene glycol and decamethylene glycol; alicyclic glycols such as cyclohexanedimethanol; aromatic diols such as hydroquinone, resorcin and 2,2-bis(4-hydroxyphenyl)propane; aromatic ring-containing aliphatic diols such as 1,4-dihydroxymethylbenzene; and polyalkylene glycols (polyoxyalkylene glycols) such as polyethylene glycol, polypropylene glycol and polytetramethylene glycol.

The above polyester used in the present invention includes a polyester containing 20 mol % or less, based on the total amount of the dicarboxylic acid component and oxycarboxylic acid component, of a component derived from oxycarboxylic acids such as aromatic oxyacids, e.g. hydroxybenzoic acid and aliphatic oxyacids, e.g. ω-hydroxycaproic acid. The above component derived from oxycarboxylic acid may be a unit of a copolyester or may be bonded to a polyester.

The polyester used in the present invention further includes a polyester obtained by copolymerizing a polycarboxylic acid or polyhydroxy compound having at least three functional groups such as trimellitic acid or pentaerythritol in such an amount that the polyester is substantially linear, e.g., 2 mol % or less, based on the total amounts of the acid components.

The above polyester is known per se, and can be produced by a method known per se.

The intrinsic viscosity, measured in o-chlorophenol at 35° C., of the above polyester is preferably approximately 0.4 to 0.8, more preferably 0.5 to 0.7, particularly preferably 0.55 to 0.65.

The first polyester layer (A) contains (a) externally added inert inorganic fine particles having an average particle diameter, $d_a$, of 0.02 to 0.3 μm and (b) externally added inert organic fine particles whose average particle diameter, $d_b$, is greater than $d_a$ and is 0.2 to 1.5 μm.

The "externally added" particles refer to particles which have been externally added to the polyester, and this term means that the externally added particles differ from particles which have been formed in a polyester polymerization system.

The inert inorganic fine particles (a) are required to have an average particle diameter (average secondary particle diameter), $d_a$, of 0.02 to 0.3 μm. When this average particle diameter is too small, undesirably, the particles are too small to obtain fine protrusions required for achieving scratch resistance and abrasion resistance. When this average particle diameter is too large, undesirably, aggregates are too large and abrasion dust is liable to occur. The amount of the inert inorganic fine particles (a) is 0.05 to 1.5% by weight, preferably 0.1 to 1.0% by weight, particularly preferably 0.23 to 0.58% by weight. When this amount is too small, undesirably, the effect achieved by the fine particles (a) is small. When it is too large, undesirably, some of the fine particles (a) are stacked one on another, and abrasion dust is liable to occur.

In the inert inorganic fine particles (a), the Mohs hardness of the inorganic substance constituting the inorganic fine particles is preferably at least 6, more preferably at least 8. When this Mohs hardness is too low, undesirably, the hardness of the film surface is too low and the scratch resistance is liable to deteriorate.

As the inorganic fine particles (a), particularly useful are particles of aluminum oxide or titanium oxide. The aluminum oxide preferably has the crystal form of α, θ or τ.

Further preferred is aluminum oxide in which an α-crystal form is contained in a θ- or τ-crystal form. Above all, particularly preferred is aluminum oxide having a θ-crystal form.

The average particle diameter, $d_b$, of the inert organic fine particles (b) is required to be 0.2 to 1.5, and to be greater than the above $d_a$. The average particle diameter, $d_b$, is preferably 0.3 to 1.0 μm, more preferably 0.4 to 0.9 μm, particularly preferably 0.6 to 0.8 μm.

When the average particle diameter, $d_b$, is too small, undesirably, the protrusion height is insufficient, the lubricity of the film is insufficient, and a film edge surface of the film roll is liable to be uneven. When the average particle diameter, $d_b$, is too large, undesirably, the abrasion resistance deteriorates even when the Mohs hardness of the particles is less than 3. The amount of the inert organic fine particles (b) is 0.001 to 1% by weight, preferably 0.005 to 0.6% by weight, more preferably 0.007 to 0.3% by weight, particularly preferably 0.01 to 0.1% by weight. When this amount is too small, undesirably, the film has a high static friction coefficient and shows insufficient lubricity. When this amount is too large, undesirably, the number of protrusion to be formed on the film is too large and abrasion dust is liable to occur. In this case, further, the film surface is too toughened, and when a magnetic recording medium is produced, the roughness of the film is imprinted on a magnetic layer to decrease the electromagnetic characteristic. The amount of the inert organic fine particles (b) based on the total amount of the inert inorganic fine particles (a) and the inert organic fine particles (b) is preferably 40% by weight or less, more preferably 30% by weight or less, particularly preferably 20% by weight or less, the most preferably 10% by weight or less. When this amount is too large, undesirably, the scratch resistance deteriorates.

In the organic fine particles (b), the Mohs hardness of the organic substance constituting the organic fine particles (b) is preferably less than 3, more preferably less than 2, particularly preferably less than 1. When this Mohs hardness is too large, undesirably, the stress concentration on the inert organic fine particles (b) forming the protrusions is heightened when a high stress (high shear force) is exerted at a calender step in a processing step, and as a result, the inert organic fine particles (b) are liable to come off and abrasion dust is liable to occur. When the Mohs hardness is as small as less than 3, the number of particles which come off decreases and the amount of abrasion dust decreases, presumably because the inert organic fine particles (b) are deformed when a stress is concentrated on surface protrusions at a calender step.

The inert organic fine particles (b) used in the present invention are not specially limited if they satisfy the above properties, while preferred are, for example, fine particles of a crosslinked polymer such as a silicone resin, a crosslinked polystyrene resin or a crosslinked acrylic resin, since these materials can easily give the above properties.

The above silicone resin preferably has a composition of the following formula (A), $$R_xSiO_{2-x/2} \qquad (A)$$

wherein R is a hydrocarbon group having 1 to 7 carbon atoms and x is a number of 1 to 1.2.

In the above formula (A), R is a hydrocarbon group having 1 to 7 carbon atoms, and preferred are an alkyl group having 1 to 7 carbon atoms, a phenyl group and a tolyl group. The alkyl group having 1 to 7 carbon atoms may be linear or branched, and examples thereof include methyl, ethyl, n-propyl, isopropyl, n-butyl, isobutyl, tert-butyl, n-pentyl and n-heptyl.

As R, methyl and phenyl are preferred, and methyl is particularly preferred.

In the above formula (A), x is a number of 1 to 1.2. When x in the formula (A) is 1, the above formula (A) is shown as the following formula (A)-1, $$RSiO_{1.5} \qquad (A)\text{-}1$$

wherein R is as defined above.

The composition of the above formula (A)-1 is derived from the following structural moiety of a tridimensional polymer chain of a silicone resin.

When x in the above formula (A) is 1.2, the above formula (A) is shown as the following formula (A)-2, $$R_{1.2}SiO_{1.4} \qquad (A)\text{-}2$$

wherein R is as defined above.

It can be understood that the composition of the above formula (A)-2 is composed of 0.8 mol of the structure of the above formula (A)-1 and 0.2 mol of the structure of the following formula (A)', $$R_2SiO \qquad (A)'$$

wherein R is as defined above.

The structure of the above formula (A)' is derived from the following structural moiety of the tridimensional polymer chain of a silicone resin.

It can be understood from the above explanation that the composition of the formula (A) in the present invention is composed substantially of the structure of the above formula (A)-1 alone, or is composed of the structure of the formula (A)-1 and the structure of the formula (A)-2 in a state in which these two types of structures are bonded at random in a proper amount ratio.

As particles of the silicone resin, x in the above formula (A) is preferably between 1 and 1.1.

The particles of a crosslinked polystyrene resin are obtained by emulsion-polymerizing a styrene derivative monomer, at least one other monomer and a polyfunctional vinyl compound as a crosslinking agent for forming polymer particles having a tridimensional structure, in an aqueous medium in which a water-soluble polymer is dissolved as protective colloid, to prepare an emulsion of polymer particles, milling the polymer particles with a jet-mill and classifying them. Examples of the styrene derivative monomer include a styrene monomer, a methylstyrene monomer, α-methylstyrene monomer and a dichlorostyrene monomer. Examples of the above "other monomer" include a conjugated diene monomer of butadiene, unsaturated nitrile monomers such as acrylonitrile, methacrylate ester monomers such as methyl methacrylate, functional monomers such as unsaturated carboxylic acid, hydroxyl-containing monomers such as hydroxyethyl methacrylate, epoxide group-containing monomers such as glycidyl methacrylate, and unsaturated sulfonic acid. Examples of the polyfunctional vinyl compound include divinylbenzene, ethylene glycol dimethacrylate, trimethylolpropane triacrylate and diallyl phthalate.

The particles of the crosslinked polystyrene resin are free from being dissolved or melted in a polymerization for producing the polyester, and are also free from being melted in melting the polymer for forming a film.

In the present invention, as required, the aromatic polyester may contain inert fine particles other than the above fine particles (a) and (b) in an amount of 25% by weight or less, preferably 10% by weight or less, based on the total amount of the inert particles. When the amount of the above "other particles" is too large, undesirably, the film shows poor abrasion resistance.

The first thin polyester layer (A) is required to have a thickness which satisfies the following expressions (1), (2) and (8) relative to the average particle diameter, $d_b$, of the above inert organic fine particles (b), $$d_b \leq 10t - 1 \qquad (1)$$

$$d_b \leq 0.5t - 1 \qquad (2)$$

$$0.12 \leq t \leq 4.0 \qquad (3)$$

wherein t is a thickness (μm) of the first thin polyester layer (A), and the unit for $d_b$ is also μm.

When the thickness of the polyester layer (A) satisfies the above expressions, the biaxially oriented laminated polyester film is excellent in scratch resistance and abrasion resistance and is also excellent in lubricity and take-up properties.

Concerning the above expressions, preferred is a biaxially oriented laminated polyester film having the first polyester layer (A) whose thickness satisfies the above expressions (2) and (3) and the following expression (1)-1.

$$d_b \leq 5t - 1 \qquad (1)\text{-}1$$

More preferred is a biaxially oriented laminated polyester film having the first polyester layer (A) whose thickness satisfies the above expressions (2) and (3) and the following expression (1)-2.

$$d_b \leq 2t - 1 \qquad (1)\text{-}2$$

Particularly preferred is a biaxially oriented laminated polyester film having the first polyester layer (A) whose thickness satisfies the above expressions (2) and (3) and the following expression (1)-3.

$$d_b \leq t - 1 \qquad (1)\text{-}3$$

When the relationship between the particle diameter, $d_b$, and the thickness, t, is outside the above range of the formula (1), undesirably, the particles are liable to come off and the abrasion resistance is liable to deteriorate.

When the relationship between the particle diameter, $d_b$, and the thickness, t, is outside the range of the above expression (2), undesirably, the first polyester layer (A) affects the surface properties of the second polyester layer (B) to roughen the surface of the second polyester layer (B), for example, when the thickness of the biaxially oriented laminated polyester film is required to be decreased for producing a thin magnetic tape capable of recording for a long period of time, and the magnetic recording tape therefrom shows a decrease in electromagnetic characteristics.

For the above reason, concerning the thickness, t, of the first thin polyester layer (A), more preferred is a biaxially oriented laminated polyester film having the first polyester layer (A) whose thickness satisfies the following expression (3)-1.

$$0.12 \leq t \leq 3.0 \tag{3-1}$$

The second polyester layer (B) constituting the biaxially oriented laminated polyester film of the present invention is formed from an aromatic polyester, and at least one surface of the second polyester layer (B) has the first polyester layer (A) laminated thereon. The aromatic polyester can be selected from those which are described regarding the first polyester layer (A). The aromatic polyester constituting the first polyester layer (A) and the aromatic polyester constituting the second polyester layer (B) may be the same as each other or different from each other. It is preferred to use the same aromatic polyester for these two layers (A) and (B).

The second polyester layer (B) is preferably formed from an aromatic polyester which substantially does not contain any externally added inert fine particles or which contains 0.05 to 1.0% by weight of externally added inert fine particles whose average particle diameter is smaller than the average particle diameter, $d_b$, of the above inert organic fine particles (b).

The biaxially oriented laminated polyester film of the present invention includes a two-layered laminated film composed of one first polyester layer (A) and one second polyester layer (B) and a three-layered laminated film composed of two first polyester layers (A) and one second polyester layer (B), one of the two first polyester layers (A) being present on one surface of the second polyester layer (B) and the other being present on the other surface of the second polyester layer (B).

In the biaxially oriented laminated polyester film composed of one first polyester layer (A) and one second polyester layer (B), provided by the present invention, the difference in surface roughness (Ra) between the exposed surface of the first polyester layer (A) and the exposed surface of the Second polyester layer (B) is preferably at least 5 nm.

The biaxially oriented laminated polyester film of the present invention may be a laminate having other polyester layer sandwiched between the first polyester layer (A) and the second polyester layer (B) as far as the other polyester does not impair the properties of the biaxially oriented laminated polyester film.

The biaxially oriented laminated polyester film of the present invention can be obtained by any one of methods known per se or in the art. For example, it can be produced by preparing an unoriented laminated film and then biaxially orienting the film. This unoriented laminated film can be produced by any one of methods known in the art for forming laminated films. For example, it can be produced by a method in which a film layer to form a front surface and a film layer to form a back surface or a core layer are stacked while the polyesters are in a molten state or in a solidified state after cooled. More specifically, it can be produced, for example, by a co-extrusion.extrusion laminating method.

The laminated film obtained by the above method can be biaxially oriented by any one of methods known hitherto for producing biaxially oriented films, whereby a biaxially oriented laminated film is obtained. For example, the biaxially oriented laminated polyester film can be obtained by melt-co-extruding the aromatic polyesters at a temperature between the melting point (Tm: ° C.) of the aromatic polyesters and (Tm+70)° C. to prepare an unstretched laminated film having an intrinsic viscosity of 0.4 to 0.8 dl/g, stretching the so-prepared unstretched laminated film monoaxially (lengthwise or widthwise) at a temperature between (Tg−10)° C. and (Tg +70)° C. (in which Tg stands for the glass transition temperature of the aromatic polyesters) at a stretch ratio of at least 2.5, preferably at least 3, and then stretching the monoaxially stretched laminated film in the direction perpendicular to the above stretching direction at a temperature between Tg and (Tg+70)° C. at a stretch ratio of at least 2.5, preferably at least 3. Stretching may be further performed in the longitudinal and/or transverse directions as required. The entire stretch ratio in terms of a ratio of the area of the stretched film to the area of the unstretched film is preferably at least 9, more preferably from 12 to 35, particularly preferably from 15 to 25. Further, the biaxially oriented film can be thermoset at a temperature between (Tg+70)° C. and (Tm−10)° C. (in which Tm is a melting point of the polyester). For example, the thermosetting temperature is preferably between 180° and 250° C. The thermosetting time is preferably 1 to 60 seconds.

The surface hardness of the biaxially oriented laminated polyester film obtained by the above method is preferably at least 21, more preferably at least 23, particularly preferably at least 28. When the surface hardness is too low, undesirably, the scratch resistance decreases.

According to the present invention, therefore, the biaxially oriented laminated polyester film is excellent in lubricity, abrasion resistance and scratch resistance, and particularly, it is useful as a base film for a magnetic recording tape.

A further study of the present inventor has revealed the following concerning the laminated polyester film whose first polyester layer (A) contains two types of inert fine particles. When the externally added inorganic particles are aluminum oxide fine particles having a θ-crystal form and the aluminum oxide fine particles having a θ-crystal form are maintained in such an amount that does not exceed a predetermined ratio, there can be obtained a biaxially oriented laminated polyester film which is excellent in abrasion resistance and scratch resistance and which is free from wearing out a slitting blade used for film slitting.

According to the present invention, therefore, there is also provided a biaxially oriented laminated polyester film comprising:

(A) a first polyester layer formed from an aromatic polyester containing;

(a) θ-form aluminum oxide particles having an average particle diameter, $d_a$, of 0.02 to 0.3 μm, and (b) externally added inert fine particles whose average particle diameter, $d_b$, is greater than $d_a$ and is 0.2 to 1.5 μm, the above θ-form aluminum oxide particles (a) being contained in an amount of 0.1 to 1.0% by weight, the inert fine particles (b) being contained in an amount of 0.05 to 1.0% by weight, and (B) a second polyester layer formed from an aromatic polyester, on at least one surface of which the above first thin polyester layer is present, the thickness of the first polyester layer being 3 to 30% of the total thickness of the biaxially oriented laminated polyester film, and the content of the θ-form aluminum oxide particles being less than 0.1% by weight based on the biaxially oriented laminated polyester film.

The above biaxially oriented laminated polyester film will be sometimes referred to as a second laminated film hereinafter, and the biaxially oriented laminated polyester film detailed before the above one will be sometimes referred to as a first laminated film hereinafter.

The aromatic polyester to constitute the second laminated film of the present invention can be also selected from those described regarding the first laminated polyester.

The θ-form aluminum oxide particles contained in the first polyester layer (A) of the second laminated film have an average particle diameter, $d_a$, of 0.02 to 0.3 μm.

When the above average particle diameter, $d_a$, i.e., average secondary particle diameter is less than 0.02 μm, the particles are too small to form fine protrusions required for achieving scratch resistance and abrasion resistance. When it is larger than 0.3 μm, the aggregation of the particles are too large, and abrasion dust is liable to occur.

The amount of the θ-form aluminum oxide particles based on the aromatic polyester forming the first polyester layer (A) is at least 0.1% by weight and not more than 1.0% by weight. When this amount is. too small, the effect achieved by the contained particles is small. When it is too large, some particles are stacked one on another, and abrasion dust is liable to occur.

Among eight crystal forms of aluminum oxide, the θ-form aluminum oxide particles are optimum for achieving the combination of scratch resistance, abrasion resistance and freedom from wearing out a slitting blade. When α-form aluminum oxide particles having higher hardness than θ-form aluminum oxide particles are used, there is no improvement in freedom from wearing out of a slitting blade even if their content is decreased. When aluminum oxide particles having lower hardness than θ-form aluminum oxide particles are used, the scratch resistance is poor.

The specific surface area of the θ-form aluminum oxide particles is preferably 50 to 120 m²/g, more preferably 60 to 100 m²/g.

When the above specific surface area is less than 50 m²/g, the primary particle size is large and the scratch resistance is good, whereas abrasion dust is liable to occur and the resultant laminated polyester film tends to be scratched in more cases against a sufficiently surface-treated metal guide. When the above specific surface area exceeds 120 m²/g, the primary particles have too small a diameter to form adequate protrusions. The abrasion dust is likely to decrease, whereas the scratch resistance tends to be poor.

Further, the total pore volume of the θ-form aluminum oxide particles is preferably 0.5 to 1.0 ml/g, more preferably 0.6 to 0.9 ml/g.

When the above total pore volume is less than 0.5 ml/g, the particles are no longer porous, their affinity to the polyester decreases, and abrasion dust is liable to occur. When it exceeds 1.0 ml/g, the particles are fragile and are liable to be smashed in stretching a film for biaxially orienting it, and it is difficult to obtain relatively large protrusions having an effect on abrasion resistance to a sufficiently surface-finished metal guide.

The first polyester layer (A) of the second laminated film further contains the inert fine particles (b).

The average particle diameter, $d_b$, of the inert fine particles (B) is greater than the average particle diameter, $d_a$, of the θ-form aluminum oxide particles (a). Further, the $d_b$ is 0.2 to 1.5 μm, preferably more than 0.3 to 1.2 μm.

When the average particle diameter of an inert fine particles contained in the first polyester layer (A) is smaller than the average particle diameter of the θ-form aluminum oxide particles, the friction coefficient against guides formed of various materials is high, and the scratch resistance and abrasion resistance deteriorate. Further, in a step of producing the biaxially oriented laminated polyester film, the film is difficult to handle, and the biaxially oriented laminated polyester film as a base film for magnetic recording shows poor running properties.

The inert fine particles (b) are not specially limited in material, and the inert fine particles (b) may be inert inorganic particles of calcium carbonate, silicon oxide, titanium oxide, aluminum oxide or kaolin; inert organic particles such as silicone particles or crosslinked polystyrene particles; or internally deposited particles formed in the presence of a polymerization catalyst.

The amount of the inert fine particles (b) based on the aromatic polyester constituting the first polyester layer (A) is 0.05 to 1.0% by weight.

The second polyester layer (B) constituting the second laminated film of the present invention is formed from an aromatic polyester, and the first polyester layer (A) is laminated on at least one surface of the second polyester layer (B).

The above aromatic polyester (B) can be selected from those described regarding the first polyester layer (A). The aromatic polyester forming the first polyester layer (A) and the aromatic polyester forming the second polyester layer (B) may be the same as each other or different from each other. It is preferred to use the same aromatic polyester for these two layers (A) and (B).

The second polyester layer (B) is preferably formed from an aromatic polyester which substantially does not contain any inert fine particles or which contains 0.05 to 1.0% by weight of inert fine particles whose average particle diameter is smaller than the average particle diameter, $d_b$, of the above inert fine particles (b).

The second laminated film has the following essential requirements. The thickness of the first polyester layer (A) containing the θ-form aluminum oxide particles is 3 to 30% of the total thickness of the second laminated film, and the content of the θ-form aluminum oxide particles based on the second laminated film is less than 0.1% by weight. When these essential requirements are satisfied, the wearing out of a slit edge can be sufficiently prevented in slitting the film.

The thickness of the first polyester layer (A) is preferably 7 to 20% of the thickness of the second laminated film.

The second laminated film of the present invention includes a two-layered laminated film composed of one first polyester layer (A) and one second polyester layer (B) and a three-layered laminated film composed of two first polyester layers (A) and one second polyester layer (B), one of the two first polyester layers (A) being present on one surface of the second polyester layer (B) and the other being present on the other surface of the second polyester layer (B).

The second laminated film can be produced by the same method as that described regarding the first laminated film.

Although not specially limited, the thickness of the second laminated film is 5 to 25 μm for example.

The second laminated film is excellent in scratch resistance and abrasion resistance to all the guides such as a sufficiently surface-finished metal guide, an insufficiently surface-finished metal guide and a plastic guide, and is considerably free from wearing out a slitting blade. It is therefore very useful as a base film for a magnetic recording medium.

The present invention will be explained in more detail hereinafter by reference to Examples.

The physical property values and characteristics referred to in the present invention were measured or are defined as follows.

(1) Average particle diameter (d)

Particles were measured for sizes with a centrifugal particle size analyzer (Model CP-50, supplied by Shimadzu Corporation) to prepare a centrifugal deposition curve. A cumulative curve was prepared by calculating the sizes and amounts of particles on the basis of the centrifugal sedimentation curve, and a particle size corresponding to a 50 mass percent in the cumulative curve was taken as an average particle diameter (Particle Size Measuring Technology, Nikkan Kogyo Shimbun, 1975, pages 242–247).

(2) Specific surface area and total pore volume of powders

Powders were measured for a specific surface area and a total pore volume by a BET method with an. Auto sorb-1 (supplied by Quantachrome Corp.)

(3)-1 Flatness of film surface (Examples 10–12 and Comparative Examples 6–9)

(i) A film was measured for a central line 5 average surface roughness (Ra) according to JIS B 0601.

A chart (film surface roughness curve) was prepared with a needle-contacting type surface roughness tester (SURF-COM 30B, supplied by Tokyo Seimitsusha) with a needle radius of 2 µm under a needle pressure of 0.07 g. A portion having a length L measured in the direction of the center line of the film surface roughness curve was picked up from the film surface roughness curve. The center line of this portion picked up was taken as an X axis, the direction of the length multiplication was taken as a Y axis, and the roughness curve was expressed as Y=f(x). The value (Ra; µm) given by the following equation is defined as a film surface roughness.

$$Ra = \frac{1}{L} \int_0^L |f(x)| dx$$

In Examples, the measurement length was set at 0.25 mm. The measurement was carried out in eight places, and the largest three values of the measured data were omitted, and the average value of the remaining five values was taken as Ra.

(3)-2 Flatness on film surface (Examples 1–9 and Comparative Examples 1–5)

The measurement value is the value defined as a central line average surface roughness according to JIS-B0601, and a film was measured with a needle-contacting type surface roughness tester (Surfcoder SE-30C, supplied by Kosaka Laboratories Ltd.) under the following conditions.

(a) Needle top radius: 2 µm (b) Measurement pressure: 30 mg (c) Cut-off: 0.08 mm (d) Measurement length: 1.0 mm (e) How to arrange data: One sample was measured in five places, and the largest value was omitted. The average of the remaining four values was calculated to five decimal places, rounded off to four decimal places, and shown up to the fourth decimal place.

(4) Static friction coefficient (µs)

Two films stacked one on the other were placed on a fixed glass plate, then a sled was placed on the upper film as a load and the lower film (contacting the glass plate) was drawn with a constant speed roll (at a rate of about 10 cm/minute). A detector was fixed on one end of the upper film (one end located opposite to the direction in which the lower film was drawn), and a film/film tension (F) was detected. The sled used in this case had a bottom area of 50 cm$^2$ (80 mm×62.5 mm), and its surface to contact the film was formed of 80° neoprene rubber. The weight (P) thereof was 1 kg The static friction coefficient was calculated on the basis of the following equation.

$$\mu s = \frac{F(g)}{P(g)}$$

(5) Abrasion resistance against calender

The running surface of a base film was evaluated for abrasion resistance by a three-roll minisuper calender having nylon roll(s) and steel roll(s) as follows. The treatment temperature was 80° C., the linear pressure applied to the film was 200 kg/cm, and the film velocity was 100 m/minute. After the film was allowed to run up to a total length of 4,000 m, abrasion dust adhering to a top roll of the calender was determined on the basis of the following ratings to evaluate the abrasion resistance of the film.

<Five ratings>

1st rate: No abrasion dust on nylon roll

2nd rate: Almost no abrasion dust on nylon roll

3rd rate: A little abrasion dust on nylon roll, which was cleaned off by wiping with a dry cloth.

4th rate: Abrasion dust on nylon roll, which was hardly cleaned off by wiping with a dry cloth, but cleaned off with a solvent such as acetone.

5th rate: Heavy abrasion dust on nylon roll, which was hardly cleaned off with the above solvent.

(6)-1 Scratch resistance and abrasion resistance (Examples 10–12 and Comparative Examples 6–9)

The scratch resistance and abrasion resistance of a base film was evaluated as follows with an apparatus shown in FIG. 1, in which numeral 1 indicates a film feed reel, numeral 2 indicates a tension Controller, numerals 3, 5, 6, 8, 9 and 11 indicate free rollers, numeral 4 indicates a tension detector (inlet), numeral 7 indicates a fixed rod, numeral 10 indicates a tension detector (outlet), numeral 12 indicates a guide roller, and numeral 13 indicates a take-up reel.

The base film having a width of ½ inch prepared by slitting the sample film was allowed to run up to a total length of 200 m, under atmosphere having a temperature of 20° C. and a humidity of 60%, at a rate of 300 m/minute at an adjusted tension at the inlet of 50 g while the film was kept in contact with the fixed rod 7 at an angle θ of 30°. After the film was allowed to run as above, abrasion dust adhering to the fixed rod 7 and scratch(s) on the tape were evaluated.

The above test was carried out in the following three methods concerning the fixed rod.

Method A: A 6φ tape guide formed of SUS304 and surface-finished sufficiently (surface roughness Ra=0.015 µm) was used as the fixed rod.

Method B: A 6φ tape guide formed by bending a SUS calcined sheet and surface-finished insufficiently ( surface roughness Ra=0.15 µm) was used as the fixed rod.

Method C: Method C: A 6φ tape guide of a carbon black containing polyacetal was used as the fixed rod.

<Evaluation of abrasion dust>

1st rate: No abrasion dust

2nd rate: Slight abrasion dust

3rd rate: Plain abrasion dust

4th rate: Heavy abrasion dust

<Evaluation of scratch resistance>

1st rate: No scratch

2nd rate: 1 to 5 scratches

3rd rate: 6 to 15 scratches

4th rate: 16 or more scratches (6)-2 Scratch resistance (Examples 1–9 and Comparative Examples 1–5)

A base film having a width of ½ inch was allowed to run in the same manner as above except that the film running rate was changed to 240 m/min. Then, the base film was evaluated on the basis of the following five ratings by considering all of the size, depth and number of scratch(es).
<Five ratings>

1st rate: No scratch
2nd rate: 1–2 scratches
3rd rate: 3–8 scratches
4th rate: 9–19 large scratches
5th rate: 20 or more large and deep scratches (7) Abrasion resistance against blade A sample film was evaluated as follows with an apparatus shown in FIG. 2, in which numeral 1 indicates a film feed reel, numeral 2 indicates a tension controller, numerals 3, 5, 6 and 8 indicate free rollers, numeral 4 indicates a tension detector, numeral 14 indicates a blade (blade for testing industrial razors, supplied by GKI in U.S.A.), numeral 12 indicates a guide roller, and numeral 13 indicates a take-up reel.

Figure 2:
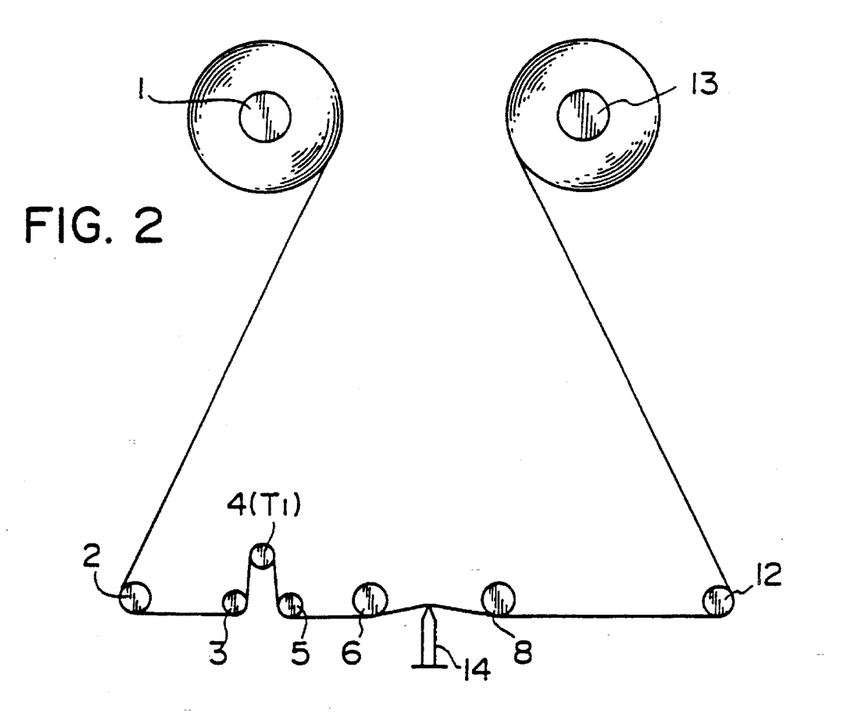
FIG. 2 schematically shows an apparatus for measuring abrasion resistance of the biaxially oriented laminated polyester film of the present invention against a blade.

A base film having a width of ½ inch prepared by slitting a sample film was allowed to run up to a total length of 100 m under a tension of 50 g at a running rate of 100 m/minute while it was in contact with a blade edge, and then evaluated for abrasion resistance on the basis of the amount of abrasion dust adhering to the blade edge.

The above evaluation is related to the impact strength of protrusions formed on a film surface and well corresponding to the occurrence of abrasion dust generated by a calender and a die coater used in a step of producing a magnetic tape.
<Evaluation>

1st rate: Abrasion dust adhering to a blade edge has a width of less than 0.5 mm.
2nd rate: Abrasion dust adhering to a blade edge has a width of 0.5 to and excluding 1.0 mm.
3rd rate: Abrasion dust adhering to a blade edge has a width of 1.0 mm to and excluding 2.0 mm.
4th rate: Abrasion dust adhering to a blade edge has a width of 2.0 mm or greater.

(8) Surface hardness of film

A quadrilateral pyramid shaped presser of diamond (top end having a pyramid form, its area-facing angle being 136°, a ridgeline-facing angle being 148° 7') was pressed on a base film on a glass plate under a load (P) of 25 g for 10 seconds. The load was divided by an area of a dent formed after the load was removed, and the quotient was taken as hardness.

$$\text{Hardness } (HV) = \frac{1,854.4 \times P}{d^2}$$

wherein P=load (g) and d=length of diagonal line of formed dent (μm).

(9) Scratch resistance in repeated running at low speed

Figure 1:
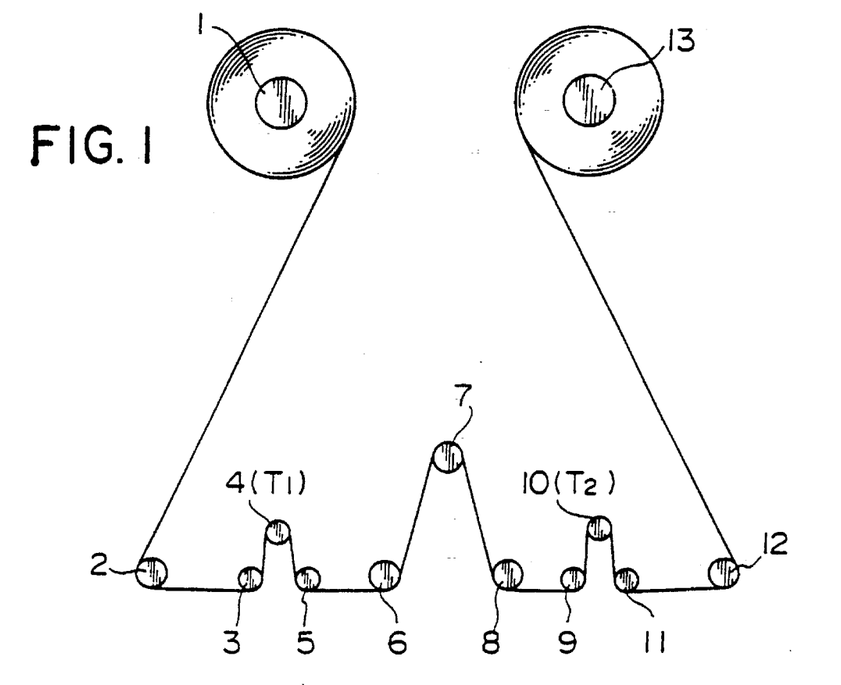
FIG. 1 schematically shows an apparatus for measuring a running friction coefficient of the biaxially oriented laminated polyester film of the present invention.

A base film was allowed to run 10 m back and forth 50 times in the same apparatus as that used in the measurement of a running friction coefficient (μk) and shown in FIG. 1, and after having run, the film was evaluated for scratch resistance.

The above test was carried out in the following three methods concerning the fixed rod.

Method A: A 6φ tape guide formed of SUS304 and surface-finished sufficiently (surface roughness Ra=0.015 μm) was used as the fixed rod.

Method B: A 6φ tape guide formed by bending an SUS calcined sheet into a shape of a cylinder and surface-finished insufficiently (surface roughness Ra=0.15 μm) was used as the fixed rod.

Method C: Method C: A 6φ tape guide of a carbon black containing polyacetal was used as the fixed rod.
<Evaluation of scratch resistance>

1st rate: No scratch
2nd rate: 1 to 5 scratches
3rd rate: 6 to 15 scratches
4th rate: 16 or more scratches (10) Freedom from wearing out slitting blade A film was slit in a length of 2,500 m with a blade used for testing industrial razors, supplied by GKI in U.S.A., and the blade was measured for a wear-out amount through an electron microscope.
<Determination of wear-out amount of slitting blade>

1st rate: 1 μm or less of wear-out amount
2nd rate: from and excluding 1 μm to 2 μm of wear-out amount
3rd rate: from and excluding 2 μm to 3 μm of wear-out amount
4th rate: more than 3 μm of wear-out amount

EXAMPLES 1–6 AND COMPARATIVE EXAMPLES 1–3

Dimethyl terephthalate and ethylene glycol were polymerized together with particles as a lubricant shown in Table 1 according to a conventional method in the presence of manganese acetate as an ester interchange catalyst, antimony trioxide as a polymerization catalyst and phosphorous acid as a stabilizer to obtain polyethylene terephthalates having an intrinsic viscosity (measured in o-chlorophenol at 35° C.) of 0.62 for a layer A and a layer B.

The pellets of the above-obtained polyethylene terephthalates were dried at 170° C. for 3 hours, respectively fed to hoppers of two extruders, melted at a melting temperature of 280° to 300° C., laminated through a multimanifold type co-extrusion die, and extruded onto a rotary cooling drum having a surface finish of about 0.3s and having a surface temperature of 20° C. to give an unstretched laminated film having a thickness of 200 μm.

The above unstretched film was preheated to 75° C., stretched at a stretch ratio of 3.1 in the length direction through a nip formed by low-velocity and high-velocity rolls by heating it with an IR heater having a surface temperature of 850° C., located 10 mm above the film. The film was rapidly cooled, fed to a stenter and stretched at a stretch ratio of 4.0 in the width direction at 100° C.

Subsequently, the above-stretched film was preheated to 110° C., and stretched at a stretch ratio of 1.8 in the length direction through a nip formed by low-velocity and high-velocity rolls. The so-obtained biaxially oriented film was thermoset under hot air at 215° C. for 4 seconds to give a biaxially oriented laminated polyester film having a thickness of 7.5 μm.

Table 1 shows the properties of the film.

As is clearly shown in Table 1, biaxially oriented laminated polyester films according to the present invention have low static friction coefficients and excellent lubricity and are excellent in scratch resistance, abrasion resistance against calender and abrasion resistance against blade. These films had F-5 values of 19 kg/mm$^2$ in the length direction and 12 kg/mm$^2$ in the width direction.

TABLE 1

|  |  |  | Example 1 | Example 2 | Example 3 |
|---|---|---|---|---|---|
| Layer A | Inert particles A | Kind | Al₂O₃ | Al₂O₃ | Al₂O₃ |
|  |  | Average particle diameter (μm) | 0.20 | 0.20 | 0.18 |
|  |  | Amount (%) | 0.4 | 0.4 | 0.4 |
|  |  | Mohs hardness | 8 | 8 | 8 |
|  | Inert particles B | Kind | Silicone resin | Silicone resin | Silicone resin |
|  |  | Average particle diameter (μm) | 0.47 | 0.47 | 0.64 |
|  |  | Amount (%) | 0.1 | 0.25 | 0.03 |
|  |  | Mohs hardness | 1 | 1 | 1 |
|  | Layer thickness (μm) |  | 0.3 | 0.3 | 0.3 |
| Layer B | Kind |  | Silica | Silica | Silica |
|  | Average particle diameter (μm) |  | 0.12 | 0.12 | 0.12 |
|  | Amount (%) |  | 0.2 | 0.2 | 0.2 |
|  | Layer thickness (μm) |  | 7.2 | 7.2 | 7.2 |
| Film properties | Surface roughness Ra |  |  |  |  |
|  | Layer A (nm) |  | 12 | 20 | 10 |
|  | Layer B (nm) |  | 4 | 4 | 4 |
|  | Static-friction coefficient μs |  | 0.6 | 0.4 | 0.7 |
|  | Scratch resistance (rating) Layer A |  | 1 | 2 | 1 |
|  | Abrasion resistance against calender (rating) Layer A |  | 1 | 2 | 1 |
|  | Abrasion resistance against blade (rating) Layer A |  | 1 | 2 | 1 |

|  |  |  | Example 4 | Example 5 | Example 6 |
|---|---|---|---|---|---|
| Layer A | Inert particles A | Kind | Al₂O₃ | Al₂O₃ | TiO₂ |
|  |  | Average particles diameter (μm) | 0.18 | 0.20 | 0.27 |
|  |  | Amount (%) | 0.4 | 0.4 | 0.4 |
|  |  | Mohs hardness | 8 | 8 | 7 |
|  | Inert particles B | Kind | Silicone resin | Crosslinked polystyrene | Silicone resin |
|  |  | Average particle diameter (μm) | 0.9 | 0.74 | 0.64 |
|  |  | Amount (%) | 0.02 | 0.03 | 0.03 |
|  |  | Mohs hardness | 1 | 1 | 1 |
|  | Layer thickness (μm) |  | 0.3 | 0.3 | 0.3 |
| Layer B | Kind |  | Silica | Silica | Silica |
|  | Average particle diameter (μm) |  | 0.12 | 0.12 | 0.12 |
|  | Amount (%) |  | 0.2 | 0.2 | 0.2 |
|  | Layer thickness (μm) |  | 7.2 | 7.2 | 7.2 |
| Film properties | Surface roughness Ra |  |  |  |  |
|  | Layer A (nm) |  | 13 | 12 | 11 |
|  | Layer B (nm) |  | 4 | 4 | 4 |
|  | Static-friction coefficient μs |  | 0.7 | 0.7 | 0.6 |
|  | Scratch resistance (rating) Layer A |  | 1 | 1 | 1 |
|  | Abrasion resistance against calender (rating) Layer A |  | 1 | 1 | 2 |

TABLE 1-continued

|  |  |  | Comp. Ex. 1 | Comp. Ex. 2 | Comp. Ex. 3 |
| --- | --- | --- | --- | --- | --- |
|  | Abrasion resistance against blade (rating) Layer A |  | 1 | 1 | 2 |

|  |  |  | Comp. Ex. 1 | Comp. Ex. 2 | Comp. Ex. 3 |
| --- | --- | --- | --- | --- | --- |
| Layer A | Inert particles A | Kind | Silica | $Al_2O_3$ | $Al_2O_3$ |
|  |  | Average particle diameter (μm) | 0.16 | 0.20 | 0.20 |
|  |  | Amount (%) | 0.4 | 0.4 | 0.4 |
|  |  | Mohs hardness | 4 | 8 | 8 |
|  | Inert particles B | Kind | Calcium carbonate | Silica | Silicone resin |
|  |  | Average particle diameter (μm) | 0.58 | 0.8 | 0.18 |
|  |  | Amount (%) | 0.16 | 0.05 | 0.03 |
|  |  | Mohs hardness | 3 | 4 | 1 |
|  | Layer thickness (μm) |  | 0.3 | 0.3 | 0.3 |
| Layer B | Kind |  | Silica | Silica | Silica |
|  | Average particle diameter (μm) |  | 0.12 | 0.12 | 0.12 |
|  | Amount (%) |  | 0.2 | 0.2 | 0.2 |
|  | Layer thickness (μm) |  | 7.2 | 7.2 | 7.2 |
| Film properties | Surface roughness Ra |  |  |  |  |
|  | Layer A (nm) |  | 10 | 11 | 4 |
|  | Layer B (nm) |  | 4 | 4 | 4 |
|  | Static-friction coefficient μs |  | 0.5 | 0.6 | 1< |
|  | Scratch resistance (rating) Layer A |  | 4 | 2 | 1 |
|  | Abrasion resistance against calender (rating) Layer A |  | 4 | 4 | 1 |
|  | Abrasion resistance against blade (rating) Layer A |  | 4 | 4 | 1 |

EXAMPLES 7–9 AND COMPARATIVE EXAMPLES 4 AND 5

Example 1 was repeated except that the layer A:layer B thickness ratio was changed to 1:2 (Examples 7 to 9 and Comparative Example 4) or 2:1 (Comparative Example 5), to obtain biaxially oriented laminated polyester films. Table 2 shows the results.

TABLE 2

|  |  |  | Example 7 | Example 8 | Example 9 |
| --- | --- | --- | --- | --- | --- |
| Layer A | Inert particles A | Kind | $Al_2O_3$ | $Al_2O_3$ | $Al_2O_3$ |
|  |  | Average particle diameter (μm) | 0.20 | 0.20 | 0.20 |
|  |  | Amount (%) | 0.2 | 0.2 | 0.2 |
|  |  | Mohs hardness | 8 | 8 | 8 |
|  | Inert particles B | Kind | Silicone resin | Silicone resin | Crosslinked polystyrene |
|  |  | Average particle diameter (μm) | 0.58 | 0.47 | 1.2 |
|  |  | Amount (%) | 0.12 | 0.12 | 0.05 |
|  |  | Mohs hardness | 1 | 1 | 1 |
|  | Layer thickness (μm) |  | 2.5 | 2.5 | 2.5 |
| Layer B | Kind |  | Silica | Silica | Silica |
|  | Average particle diameter (μm) |  | 0.12 | 0.12 | 0.12 |

TABLE 2-continued

|  |  |  |  |  |  |
|---|---|---|---|---|---|
|  | Amount (%) |  | 0.2 | 0.2 | 0.2 |
|  | Layer thickness (μm) |  | 5.0 | 5.0 | 5.0 |
| Film | Surface roughness Ra |  |  |  |  |
| proper- | Layer A (nm) |  | 13 | 12 | 16 |
| ties | Layer B (nm) |  | 4 | 4 | 4 |
|  | Static-friction coefficient μs |  | 0.5 | 0.6 | 0.6 |
|  | Scratch resistance (rating) Layer A |  | 1 | 1 | 1 |
|  | Abrasion resistance against calender (rating) Layer A |  | 1 | 1 | 1 |
|  | Abrasion resistance against blade (rating) Layer A |  | 1 | 1 | 1 |

|  |  |  | Comp. Ex. 4 | Comp. Ex. 5 |
|---|---|---|---|---|
| Layer A | Inert particles A | Kind | Silica | $Al_2O_3$ |
|  |  | Average particle diameter (μm) | 0.16 | 0.20 |
|  |  | Amount (%) | 0.15 | 0.2 |
|  |  | Mohs hardness | 4 | 8 |
|  | Inert particles B | Kind | Calcium carbonate | Crosslinked polystyrene |
|  |  | Average particle diameter (μm) | 0.58 | 1.2 |
|  |  | Amount (%) | 0.16 | 0.05 |
|  |  | Mohs hardness | 3 | 1 |
|  | Layer thickness (μM) |  | 2.5 | 5.0 |
| Layer B | Kind |  | Silica | Silica |
|  | Average particle diameter (μm) |  | 0.12 | 0.12 |
|  | Amount (%) |  | 0.2 | 0.2 |
|  | Layer thickness (μm) |  | 5.0 | 2.5 |
| Film | Surface roughness Ra |  |  |  |
| proper- | Layer A (nm) |  | 10 | 16 |
| ties | Layer B (nm) |  | 4 | 7 |
|  | Static-friction coefficient μs |  | 0.6 | 0.6 |
|  | Scratch resistance (rating) Layer A |  | 4 | 1 |
|  | Abrasion resistance against calender (rating) Layer A |  | 4 | 1 |
|  | Abrasion resistance against blade (rating) Layer A |  | 4 | 1 |

EXAMPLES 10–12 AND COMPARATIVE EXAMPLES 6–9

Dimethyl terephthalate and ethylene glycol were polymerized together with particles as a lubricant shown in Table 3 according to a conventional method in the presence of manganese acetate as an ester interchange catalyst, antimony trioxide as a polymerization catalyst and phosphorous acid as a stabilizer to obtain a polyethylene terephthalate having an intrinsic viscosity (measured in o-chlorophenol at 38° C.) of 0.62 for a layer A.

The above procedures were repeated except that the particles were not added, to obtain a polyethylene terephthalate for a layer B.

The pellets of the above-obtained polyethylene terephthalates were dried at 170° C. for 3 hours, respectively fed to hoppers of two extruders, melted at a melting temperature of 280° to 300° C., laminated through a multimanifold type co-extrusion die, and extruded onto a rotary cooling drum having a surface finish of about 0.3s and having a surface temperature of 20° C. to give an unstretched laminated film having a thickness of 200 μm.

The above unstretched laminated film was preheated to 75° C., stretched at a stretch ratio of 3.6 in the length direction through a nip formed by low-velocity and high-velocity rolls with heating it with one IR heater having a surface temperature of 900° C., located 15 mm above the film. The film was rapidly cooled, fed to a stenter and stretched at a stretch ratio of 3.9 in the width direction at 105° C. The so-obtained biaxially oriented film was thermoset at 205° C. for 5 seconds to give a biaxially oriented laminated polyester film having a thickness of 14 μm.

Separately, 100 parts by weight (hereinafter referred to as "part") of $\tau$-$Fe_2O_3$ and the following components were kneaded and dispersed in a ball mill for 12 hours.

| | |
|---|---|
| Polyester polyurethane | 12 parts |
| Vinyl chloride-vinyl acetate-maleic anhydride copolymer | 10 parts |
| γ-Alumina | 5 parts |
| Carbon black | 1 part |
| Butyl acetate | 70 parts |
| Methyl ethyl ketone | 35 parts |
| Cyclohexanone | 100 parts |

Thereafter, the following components were further added, and the kneading was further continued for 15 to 30 minutes.

| | |
|---|---|
| Fatty acid: Oleic acid | 1 part |
| Fatty acid: Palmitic acid | 1 part |
| Fatty acid ester (Amyl stearate) | 1 part |

Further, 7 parts of a solution of 25% of a triisocyanate compound in ethyl acetate was added, and the mixture was dispersed with shear at a high velocity for 1 hour to obtain a solution of a magnetic coating composition.

The solution of the magnetic coating composition was applied to each of the above-obtained biaxially oriented laminated polyester films having a thickness of 14 μm such that the dry coatings had a thickness of 3.5 μm.

Then, the coated films were subjected to orientation treatment in a direct current magnetic field and dried at 100° C. The dried coated films were subjected to calender treatment and slit to a width of ½ inch to give magnetic tapes having a thickness of 17.5 μm.

Table 3 shows the properties of the above-obtained magnetic tapes.

TABLE 3

| | | | Unit | Ex. 10 | Ex. 11 |
|---|---|---|---|---|---|
| Layer A | Aluminum oxide particles | Specific surface area | m²/g | 80 | 31 |
| | | Total pore volume | ml/g | 0.75 | 0.75 |
| | | Average particle diameter | μm | 0.20 | 0.20 |
| | | Amount | % | 0.3 | 0.3 |
| | | Crystal form | | θ | θ |
| | Other particles | Kind | | CaCO₃ | CaCO₃ |
| | | Average particle diameter | μm | 0.6 | 0.6 |
| | | Amount | % | 0.3 | 0.2 |
| | | Kind | | | SiO₂ |
| | | Average particle diameter | μm | | 0.4 |
| | | Amount | % | | 0.1 |
| | Thickness of layer A | | m | 2.0 | 2.0 |
| | Thickness ratio of layer A | | % | 14 | 14 |
| Layer B | Thickness of layer B | | μm | 12.0 | 12.0 |
| Total thickness | | | μm | 14.0 | 14.0 |
| Surface roughness Ra (layer A) | | | nm | 20 | 20 |
| Freedom from waering out of blade | | | | 2 | 2 |
| Aluminum oxide content | | | % | 0.04 | 0.04 |
| High-velocity scratch resistance | Method A | Abrasion resistance | | 1 | 1 |
| | | Scratch resistance | | 1 | 1 |
| | Method B | Abrasion resistance | | 1 | 1 |
| | | Scratch resistance | | 1 | 1 |
| | Method C | Abrasion resistance | | 1 | 1 |
| | | Scratch resistance | | 1 | 1 |
| Low-velocity scratch resistance | Method A | Scratch resistance | | 1 | 1 |
| | Method B | Scratch resistance | | 1 | 1 |
| | Method C | Scratch resistance | | 1 | 1 |

| | | | Unit | Ex. 12 | Comp. Ex. 6 |
|---|---|---|---|---|---|
| Layer A | Aluminum oxide particles | Specific surface area | m²/g | 80 | 40 |
| | | Total pore volume | ml/g | 0.75 | 0.2 |
| | | Average particle diameter | μm | 0.20 | 0.20 |
| | | Amount | % | 0.3 | 0.3 |
| | | Crystal form | | θ | α |
| | Other particles | Kind | | CaCO₃ | CaCO₃ |
| | | Average particle diameter | μm | 0.6 | 0.6 |

TABLE 3-continued

|  |  |  | Unit | | |
|---|---|---|---|---|---|
|  |  | Amount | % | 0.3 | 0.2 |
|  |  | Kind |  |  |  |
|  |  | Average particle diameter | μm |  |  |
|  |  | Amount | % |  |  |
|  | Thickness of layer A |  | m | 1.0 | 2.0 |
|  | Thickness ratio of layer A |  | % | 7 | 14 |
| Layer B | Thickness of layer B |  | μm | 13.0 | 12.0 |
| Total thickness |  |  | μm | 14.0 | 14.0 |
| Surface roughness Ra (layer A) |  |  | nm | 18 | 20 |
| Freedom from waering out of blade |  |  |  | 1 | 4 |
| Aluminum oxide content |  |  | % | 0.02 | 0.04 |
| High-velocity scratch resistance | Method A | Abrasion resistance |  | 1 | 2 |
|  |  | Scratch resistance |  | 1 | 1 |
|  | Method B | Abrasion resistance |  | 1 | 2 |
|  |  | Scratch resistance |  | 1 | 1 |
|  | Method C | Abrasion resistance |  | 1 | 2 |
|  |  | Scratch resistance |  | 1 | 1 |
| Low-velocity scratch resistance | Method A | Scratch resistance |  | 1 | 1 |
|  | Method B | Scratch resistance |  | 1 | 1 |
|  | Method C | Scratch resistance |  | 1 | 1 |

|  |  |  | Unit | Comp. Ex. 7 | Comp. Ex. 8 |
|---|---|---|---|---|---|
| Layer A | Aluminum oxide particles | Specific surface area | m²/g | 140 | 80 |
|  |  | Total pore volume | ml/g | 1.2 | 0.75 |
|  |  | Average particle diameter | μm | 0.20 | 0.20 |
|  |  | Amount | % | 0.3 | 0.3 |
|  |  | Crystal form |  | γ | θ |
|  | Other particles | Kind |  | CaCO$_3$ | CaCO$_3$ |
|  |  | Average particle diameter | μm | 0.6 | 0.6 |
|  |  | Amount | % | 0.3 | 0.2 |
|  |  | Kind |  |  |  |
|  |  | Average particle diameter | μm |  |  |
|  |  | Amount | % |  |  |
|  | Thickness of layer A |  | m | 2.0 | 6.0 |
|  | Thickness ratio of layer A |  | % | 14 | 43 |
| Layer B | Thickness of layer B |  | μm | 12.0 | 8.0 |
| Total thickness |  |  | μm | 14.0 | 14.0 |
| Surface roughness Ra (layer A) |  |  | nm | 20 | 20 |
| Freedom from waering out of blade |  |  |  | 1 | 3 |
| Aluminum oxide content |  |  | % | 0.04 | 0.13 |
| High-velocity scratch resistance | Method A | Abrasion resistance |  | 1 | 1 |
|  |  | Scratch resistance |  | 3 | 1 |
|  | Method B | Abrasion resistance |  | 1 | 1 |
|  |  | Scratch resistance |  | 4 | 1 |
|  | Method C | Abrasion resistance |  | 1 | 1 |
|  |  | Scratch resistance |  | 4 | 1 |
| Low-velocity scratch resistance | Method A | Scratch resistance |  | 4 | 1 |
|  | Method B | Scratch resistance |  | 4 | 1 |
|  | Method C | Scratch resistance |  | 3 | 1 |

|  |  |  | Unit | Comp. Ex. 9 |
|---|---|---|---|---|
| Layer A | Aluminum oxide | Specific surface area | m²/g | 80 |

TABLE 3-continued

| | | | | |
|---|---|---|---|---|
| | particles | Total pore volume | ml/g | 0.75 |
| | | Average particle diameter | μm | 0.20 |
| | | Amount | % | 0.3 |
| | | Crystal form | | θ |
| | Other particles | Kind | | |
| | | Average particle diameter | m | |
| | | Amount | % | |
| | | Kind | | |
| | | Average particle diameter | m | |
| | | Amount | % | |
| | Thickness of layer A | | m | 2.0 |
| | Thickness ratio of layer A | | % | 14 |
| Layer B | Thickness of layer B | | μm | 12.0 |
| Total thickness | | | μm | 14.0 |
| Surface roughness Ra (layer A) | | | nm | 6 |
| Freedom from waering out of blade | | | | 1 |
| Aluminum oxide content | | | % | 0.04 |
| High-velocity scratch resistance | Method A | Abrasion resistance | | 2 |
| | | Scratch resistance | | 2 |
| | Method B | Abrasion resistance | | 2 |
| | | Scratch resistance | | 2 |
| | Method C | Abrasion resistance | | 2 |
| | | Scratch resistance | | 2 |
| Low-velocity scratch resistance | Method A | Scratch resistance | | Running impossible |
| | Method B | Scratch resistance | | Running impossible |
| | Method C | Scratch resistance | | Running impossible |

As is clearly shown in Table 3, biaxially oriented laminated polyester films according to the present invention have excellent lubricity as base films for a magnetic recording medium, have excellent abrasion resistance and scratch resistance against either of a sufficiently surface-finished metal tape guide, an insufficiently surface-finished metal tape guide and a plastic tape guide and have excellent properties of being free from wearing out a slitting blade.

What is claimed is:

1. A biaxially oriented laminated polyester film comprising:
    (A) a first polyester layer formed from an aromatic polyester containing:
        (a) θ-form aluminum oxide particles having an average particle diameter, $d_a$, of 0.02 to 0.3 μm, a specific surface area of 50 to 120 m²/g and a total pore volume of 0.5 to 1.0 ml/g, and
        (b) externally added inert fine particles whose average particle diameter, $d_b$, is greater than $d_a$ and is 0.2 to 1.5 μm,
    the above θ-form aluminum oxide particles (a) being contained in an amount of 0.1 to 1.0% by weight, the inert fine particles (b) being contained in an amount of 0.05 to 1.0% by weight, and
    (B) a second polyester layer formed from an aromatic polyester, on at least one surface of which the above first polyester layer is present,
    the thickness of the first polyester layer being 3 to 20% of the total thickness of the biaxially oriented laminated polyester film, the total thickness of the biaxially oriented laminated polyester film being 5 to 25 μm, and the content of the θ-form aluminum oxide particles being less than 0.1% by weight based on the biaxially oriented laminated polyester film.

2. The film of claim 1, wherein the externally added inert fine particles have an average particle diameter of greater than 0.3 μm to 1.2 μm.

* * * * *